Dec. 30, 1969   F. A. BEZLAJ ET AL   3,486,468
LADING SEPARATING MEANS

Filed Jan. 30, 1967   5 Sheets-Sheet 1

INVENTORS
FRANK A. BEZLAJ
GERALD R. McLAUGHLIN
RUSSELL M. LOOMIS
HENRY D. BREEN

BY
ATTORNEYS

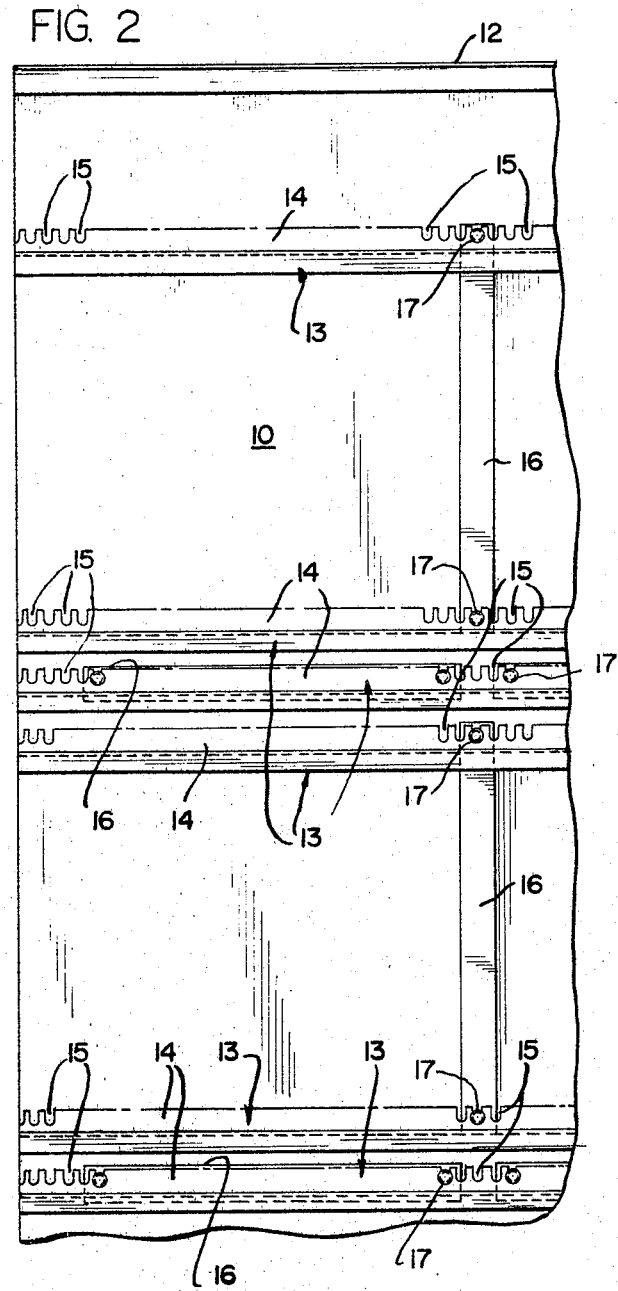
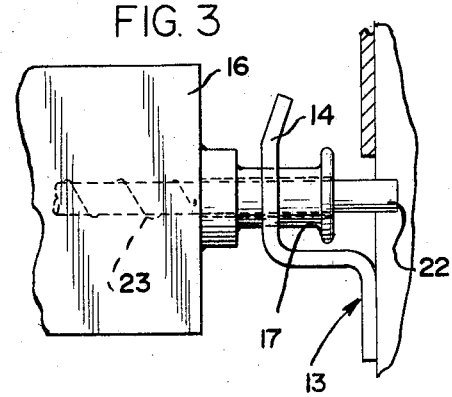
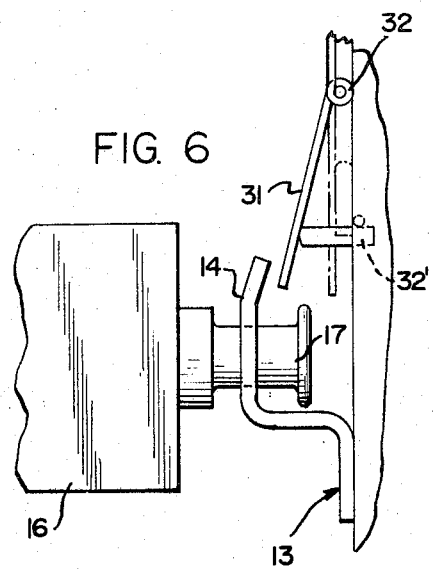

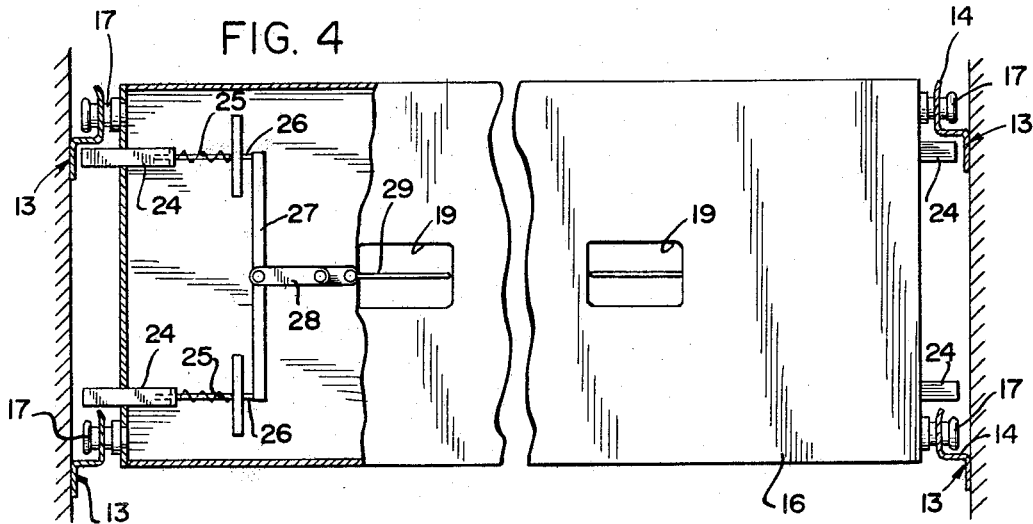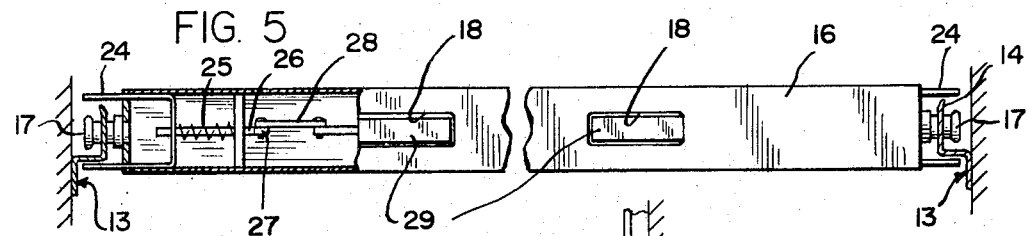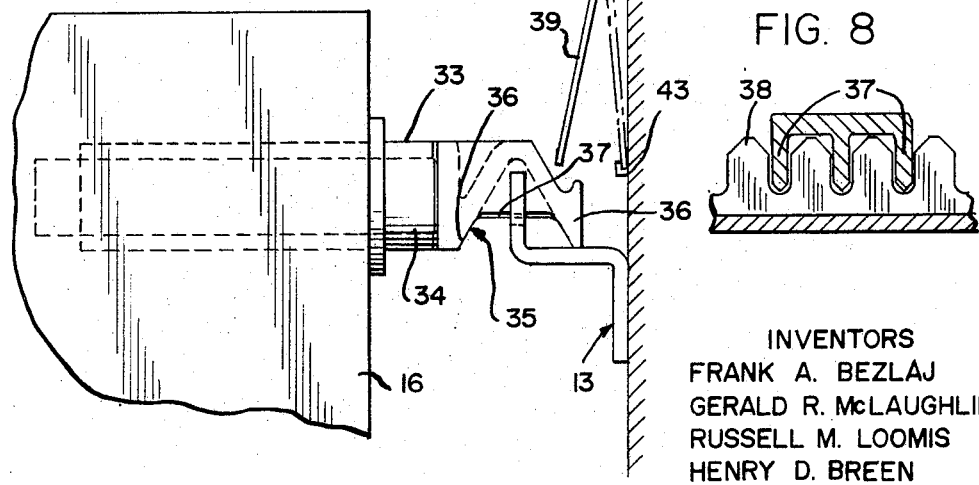

Dec. 30, 1969    F. A. BEZLAJ ET AL    3,486,468
LADING SEPARATING MEANS

Filed Jan. 30, 1967    5 Sheets-Sheet 4

INVENTORS
FRANK A. BEZLAJ
GERALD R. McLAUGHLIN
RUSSELL M. LOOMIS
HENRY D. BREEN

BY
ATTORNEYS

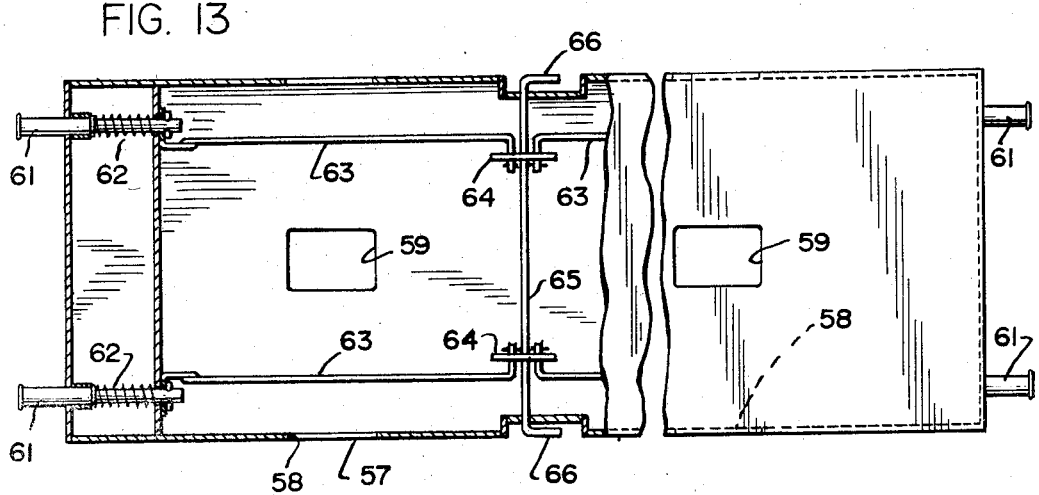

3,486,468
LADING SEPARATING MEANS
Frank A. Bezlaj, Matteson, Gerald R. McLaughlin, Western Springs, Russell M. Loomis, Palos Heights, and Henry D. Breen, Chicago, Ill., assignors to Unarco Industries, Inc., Chicago, Ill., a corporation of Illinois
Filed Jan. 30, 1967, Ser. No. 612,610
Int. Cl. B61d 45/00
U.S. Cl. 105—376
12 Claims

ABSTRACT OF THE DISCLOSURE

A bulkhead for a freight carrier is provided by a pallet-like panel which has two aperture means therein arranged to be entered by tines of a forklift truck to move the panel selectively at substantially vertical or horizontal attitudes. The panel has at each end thereof two support members constructed and arranged to cooperate with track means on opposed walls of the carrier to maintain the panel at either of said attitudes, to restrain the panel from movement longitudinally in the carrier, and to insure against the panel falling from the track means. In combination with the track means and support members on the panel, a lock means carried on either the panel or carrier further prevents accidental dislocation of the panel.

---

This invention relates to lading separating means, and more particularly to means for separating the interior of a lading carrying space in a vehicle such as a railroad car, a truck or trailer, into separated lading receiving compartments.

In shipping various types of products, and particularly products not separately boxed or packaged, it has become desirable to divide the lading space into separated compartments each of which will receive a desired number of similar or different parts. It is also highly desirable that maximum flexibility be provided in the positioning of the lading separator panels so that the compartments can be formed of different sizes and shapes. One arrangement for accomplishing this purpose is more particularly disclosed and claimed in the copending application of Bezlaj, Ser. No. 488,601, filed Sept. 20, 1965, now Patent 3,352,595, and owned by the assignee of this application.

It is one of the objects of the present invention to provide an improved lading separating means for separating lading carrying bodies into separate lading receiving compartments.

According to a feature of the invention, panels are provided which can be positioned either vertically or horizontally and which are supported and locked in selected positions on horizontal tracks on the side walls of the body.

Another object is to provide lading separating means in which the lading separating panels are securely latched against accidental displacement when they are positioned in the body.

According to another feature of the invention, the panels carry lock members which interfit with locking openings on the tracks, and releasable latch means are provided to prevent the locking members from disengaging the tracks.

According to still another feature of the invention, the panels are formed with openings to receive the tines of a forklift, and operating means for the movable latch members are carried by the panels to be engaged and moved by tines entering the openings therein to retract the latch members.

According to a further feature of the invention, latch strips are provided above at least certain of the tracks to be engaged by the lock members on the panels to assist in guiding the panels into proper position in the body. The guide strips may in some cases be formed by the tracks themselves.

The above and other objects and advantages of the invention will be more readily apparent from the following description when read in connection with the accompanying drawing, in which:

FIG. 2 is a partial longitudinal section through the car;

FIG. 3 is a partial view similar to FIG. 1, showing an alternative construction;

FIG. 4 is a partial view similar to FIG. 1, illustrating still another alternative construction;

FIG. 5 is a view at right angles to FIG. 4;

FIG. 6 is a partial view similar to FIG. 1 of still another alternative construction;

FIG. 7 is a view similar to FIG. 6 of still another alternative construction;

FIG. 8 is a partial section on the line 8—8 of FIG. 7;

FIG. 13 is a view similar to FIG. 4 of a further alternative construction.

Figure 1:
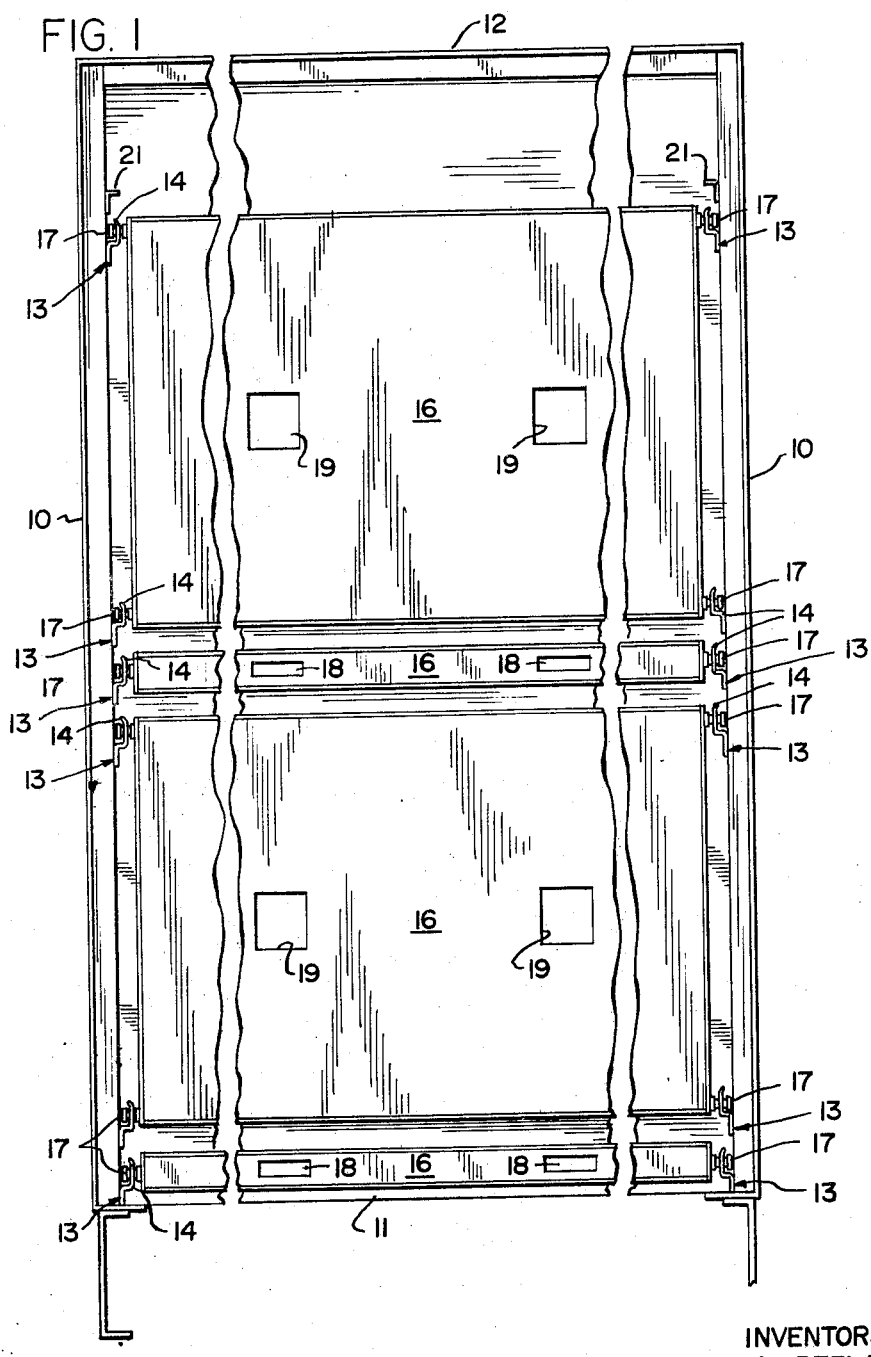
FIG. 1 is a partial sectional view through a railroad car equipped with lading separating means embodying the invention.

As shown in FIG. 1, the lading separating means of the invention is installed in a railroad car having spaced sidewalls 10, a floor 11 and a ceiling 12. The car is divided on its sidewalls at vertically spaced points with horizontally extending tracks indicated generally at 13. As shown, each of the tracks includes a downwardly extending flange which is secured to the sidewall and a generally vertically extending portion 14 which is offset inwardly from the sidewalls. As best seen in FIG. 2, the vertically inwardly offset portion 14 is formed with a series of upwardly opening notches or slots 15 which comprise locking openings to secure the separator panels in place as will be more readily apparent hereinafter.

The space within the body is adapted to be separated both vertically and horizontally by a series of identical panels 16. Each of the panels is of a length substantially to span the width of the body between the sidewalls and as seen in FIG. 1, is of a width equal to the vertical spacing between adjacent pairs of the tracks 13. For supporting the panels in the body, each panel is provided at its ends adjacent to its edges with a pin 17 projecting outwardly therefrom and rigidly secured thereto. The pins are preferably provided with enlarged heads at their outer ends as shown, and between the heads and the connections of the pins to the panel are of a diameter to fit into the slots 15.

For handling the panels, they are preferably provided with openings to receive the tines of a forklift as provided on a conventional forklift truck. As shown, openings 18 are provided in the panels extending from edge to edge and from end to end thereof and of a size to receive the tines of a forklift. Similarly, openings 19 are provided extending from face to face of the panels and intersecting the openings 18 so that the panels can be moved into the body either vertically or horizontally from its sides or its ends by a forklift truck. One of the advantages of this arrangement is that the panels themselves may serve as pallets on which merchandise is supported for transporting it by forklift truck and can be loaded into or unloaded from a vehicle without requiring the use of separate pallets.

In moving the panels into a car body, for example by means of a forklift truck, it is desirable to provide guide strips against which the pins 17 can abut both to hold the panels in the desired vertical position and also to prevent engagement of the pins with the side wall structure of the car. This is particularly important in the case of a car in which sheathing is not provided over the side walls and exposed beams are present. For this purpose a guide strip which may be in the form of an angle strip 21 is secured to each side wall of the car immediately above the uppermost track therein. The strip 21 has a downwardly extending flange and a horizontal inwardly extending flange at its upper edge so that when a panel is being moved into the body, the upper pins thereof in the case of a vertical panel, or both pins in the case of a horizontal panel, may rise against the vertical flange of the strip 21 and will be held in a desired vertical position by the horizontal flange thereof. In the case of the lower tracks in the body such, for example, as the three closely positioned tracks as shown in FIG. 1, the downwardly extending vertical mounting portion of each upper track and the horizontally offset portion thereof immediately above the vertical portion serve the same purpose as the strip 21. In this way the panels, whether horizontal or vertical, can be moved into the car to the desired position and lowered to drop the pins 17 into the slots or groove 15 which will retain the panels against longitudinal movement along the tracks.

In many cases it may become desirable to provide, in addition to the locking means as hereinabove described, a safety latching means which will prevent accidental bouncing of the pins out of the notches in the tracks. One construction for accomplishing this purpose is shown in FIG. 3, wherein parts corresponding to like parts in FIGS. 1 and 2 are indicated by the same reference numerals. In this construction an elongated latch pin 22 is slidably mounted in the panel and extends through an axial bore in each of the pins 17. The latch pins 22 are urged outwardly from the panel by springs 23 and may be retracted by any desired type of manual or automatic retracting mechanism, one example of which is described hereinafter.

With this construction, the latch pins are normally retracted into the lock pins 17 so that the panels can be handled in the same manner as with the panels of FIGS. 1 and 2. When the panels are in the desired position, the latch pins can be released to be moved outwardly by the springs 23. In this construction, the vertical flanges of the tracks are preferably made somewhat longer than as shown in FIG. 1 so that the latch pins will engage the lower edges thereof to prevent accidental vertical movement of the panels and locking pins 17 due to bouncing of a car or the like which would remove the locking pins 17 from the slots or grooves 15. In the case of the upper track, the flange of the strip 21 may be made sufficiently long to engage the latch pins and prevent accidental removal of the locking pins from the track.

FIG. 4 illustrates still a different type of construction, parts therein corresponding to like parts in FIGS. 1 and 2 being indicated by the same reference numerals. In this construction, the panels are provided adjacent to the ends with outwardly slidable U-shaped latch members 24 which are positioned between the pins 17 as shown, and which are urged outwardly of the panel by springs 25. The latch members 24 are interconnected by a cross rod 26 which is connected by a link 27 to a crank arm 28 secured to a vane 29 which projects into the common intersection of the tine receiving openings 18 and 19.

With this construction, the safety latch members 24 will normally be in their extended position as shown in FIGS. 4 and 5. When a panel is mounted vertically as shown in FIG. 4, the upper latch member will underlie the horizontally offset portion of the adjacent track 13 to prevent the panel from moving upwardly to a point where the lock pins 17 would disengage the track. When the panel is mounted horizontally as shown in FIG. 5, the U-shaped latch member 24 will span the inwardly offset portion 14 of the adjacent track similarly to hold the panel against accidental upward movement. However, when a panel is being handled by a fork lift truck, the tines of the fork will engage the vanes 29 and swing them to a position to retract the latch members. For example, when the tines of the fork are inserted through the openings 18 with the panel in a horizontal position, the ends of the tines will engage the vanes 29 and swing them through approximately 90° so that the crank arm 28 will be turned to pull the cross rod 26 and the latch members back against the springs 25 to retract the latch members. When the panel is to be handled in a vertical position, the tines of the fork are inserted in the openings 19 below the vanes 29 so that when the panel is picked up, the tines will swing the vanes in the same manner to retract the latch members.

FIG. 6 illustrates an alternative latching construction, parts therein corresponding to like parts in FIGS. 1–5, being indicated by the same reference numerals. In this construction, the latching means comprises an elongated sheet metal strip 31 hinged to the side wall of the body at 32 and projecting downwardly from the hinge. Normally, the strip will lie in the position shown in dotted lines in which it hangs vertically closely adjacent to the side wall of the car so that it will not interfere with normal movement of the panel into and out of locking position on the track. However, when the panels are in place and it is desired to latch them against accidental movement the strip 31 can be swung outwardly to the illustrated full line position by an operator engaging the end of the strip adjacent to the door opening of the car. The strip may be held in its extended latching position by means of one or more pivoted pins 32' pivoted on the sidewall of the car and swingable from a vertical position as shown in dotted lines in which the strip can move to its vertical unlatching position to a horizontal position as shown in full line in which it will engage the strip and hold it inward from the sidewall of the car and overlying the pins 17. With the latching strip in this position the pins 17 cannot be accidentally removed from the slots or grooves in the track.

FIG. 7 illustrates still another construction in which both the locking members on the panel and the latch mechanism are modified. In this construction the panel 16 is provided adjacent its ends with mounting tubes 33 extending lengthwise of the panel. Supporting rods 34 are mounted in the tubes 33 for both limited axial sliding and rotary movement. At its outer end, each mounting rod carries a head 35 formed with an opened recess therein defined by sides 36 which taper in a direction parallel to the axis of the rod 34 from the open to the closed end of the recess. The recess is divided by one or more cross fins 37.

In this construction the track is generally similar to that of FIGS. 1–6 except that the tooth members as shown at 38 which separate the slots or grooves in the track are formed with upwardly tapering ends as best seen in FIG. 8.

In the use of this construction, the locking members 35 are turned to a position in which the cavities therein open downwardly. When the panel has been moved to the desired position in the car and is lowered, the tooth members 38 of the track will extend into the cavities with the cross members 37 entering the groove or slots in the track. The upper edges of the tooth members engaging the tapering sides 36 of the recesses will cause the rod 34 to slide longitudinally to a limited extent to accommodate minor variations in the spacing between the tracks at opposite sides of the body. At the same time the tapered upper ends of the tooth members will facilitate entry of the cross member 37 into the slots or grooves in the track so that the panel will be properly received and locked on the tracks.

For holding the lock members in place against accidental removal, a latch plate 39 similar to the latch plate 31 of FIG. 6 is hinged to the side wall of the car on a hinge axis 41. In this case a spring 42 shown as a coil spring around the hinge is provided to urge the plate 39 inwardly until its lower edge engages the upper edge of the track as shown. In this position the plate 39 will latch the lock members against accidental upward movement.

When it is desired to move the panels into or out of the car or other body, the strip 39 may be swung inwardly against the sidewall of the car to the position shown in dotted lines. The strip may be held in this position by a pivoted latch member 43 which may be positioned adjacent to the door opening of a car or similar body to be easily operated by an operator. With the panels in place, the latch 43 may be released so that the plate 39 will swing inwardly to its latching position as shown.

Figure 9:
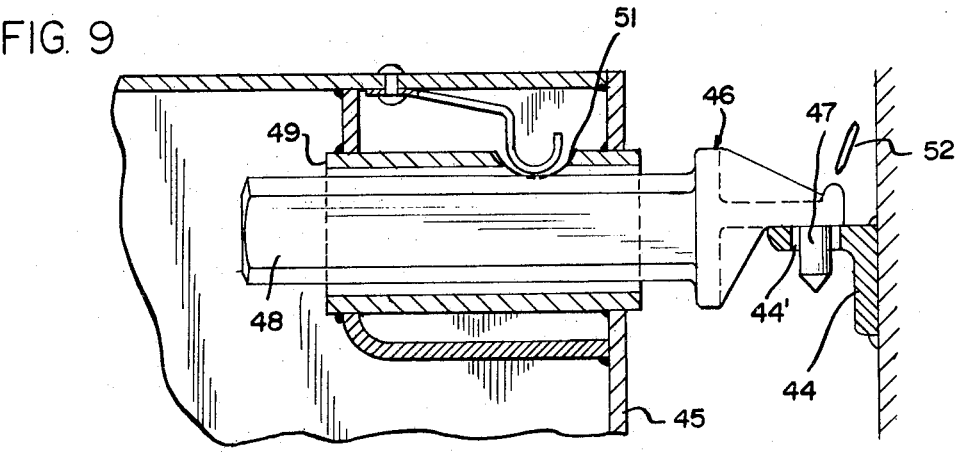
FIG. 9 is a partial view similar to FIG. 1 of still another alternative construction.

FIG. 9 shows an alternative construction wherein the track as indicated at 44 is formed by an angle strip mounted against the car sidewall with one of its flanges projecting horizontally and formed with spaced locking openings 44'. In this construction, the panel as shown at 45 carries a lock member 46 comprising a generally flat head from which a pin 47 extends. The pin 47 is of a size to fit into the locking openings 44.

The locking member 46 is carried by a rod 48 which is mounted for limited axial sliding movement in a sleeve 49 to accommodate variations in spacing between the tracks as well as for rotary movement. In this construction, the rod is formed with flutes at 90° spaced points in the circumference thereof which are yieldingly engaged by a spring detent member 51 to hold the rod in adjusted angular position.

This construction is used in generally the same manner as that of FIGS. 7 and 8 by turning the lock member to a position in which the pins 47 extend downwardly, the lock member being held in such position by the spring detent 51. When the panel is properly positioned in the car, it is lowered to allow the pins 47 to drop through the locking openings 44' as shown. The lock member can be latched against accidental upward movement by a latch plate as partially indicated at 52, which may be similar to the latch plates as shown in FIG. 6 or in FIGS. 7 or 8.

Figure 10:
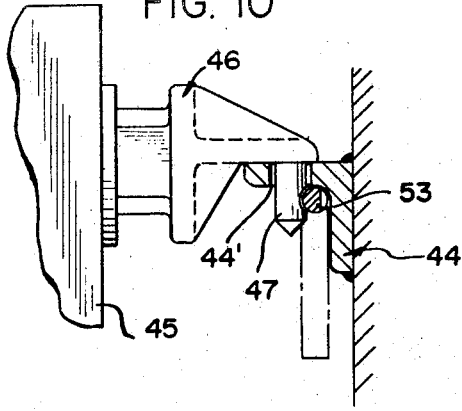
FIG. 10 is a view similar to FIG. 9, illustrating an alternative latching means.

The construction of FIG. 10 is generally similar to that of FIG. 9, except a latch rod 53 is provided in place of the latch plate 52. The latch rod coacts with the pins 47 to hold them against vertical movement. When the latch rod 53 is turned through 180°, the notches in the sides thereof will register with the pins 47 so that they can then be moved vertically out of the locking openings in the track for removal of the panel.

Figure 11:
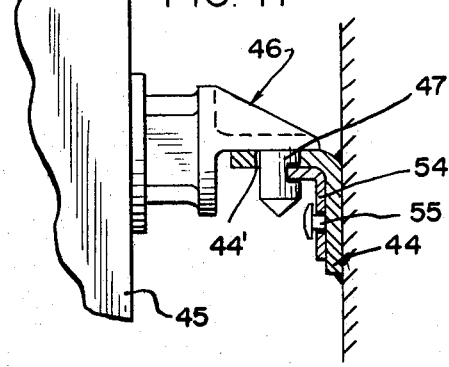
FIG. 11 is a view similar to FIG. 10, illustrating a further alternative latching means.
Figure 12:
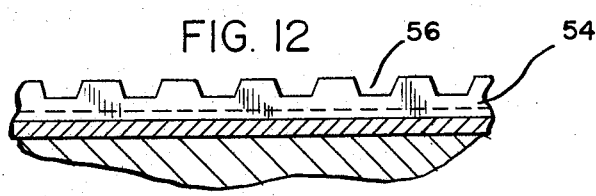
FIG. 12 is a partial plan view of the track and latching means of FIG. 11.

FIGS. 11 and 12 illustrate a construction generally similar to that of FIGS. 9 and 10 except for the latching means employed and wherein parts corresponding to like parts in FIGS. 9 and 10 are indicated by the same reference numerals.

In this construction, as in FIG. 10, the pins 47 are formed with recesses in the sides thereof which face outwardly from the panel. The latching means comprises a strip 54 which is slidably mounted on the track 43 through pins 55 carried by the track and extending through slots in the latching strip. The latching strip 54 is bent over at its upper edge and is formed with spaced notches 56 therein. With the pins 47 extending through the locking openings in the track, the latch strip 54 may be slid lengthwise to a position in which the projecting edges thereof fit into the notches in the pins 47 to hold them against vertical movement. To permit placement or removal of a pallet, the latch strip is slid to a position in which the notches 56 register with the pins 47 so that these pins are freely movable through the locking openings in the track.

In the embodiment shown in FIG. 13, the panel indicated generally at 57 is hollow as in the previous constructions and is formed with edge-to-edge openings therethrough, as indicated at 58, and with face to face openings 59 to receive the forks of a forklift truck. The panel is supported on the tracks in the car by pins 61 which project from the ends thereof and which are slidably mounted for movement into and out of the panel. The pins are urged outwardly by springs 62 to a position normally projecting substantially beyond the ends of the panel, and may be retracted by links 63 connected at one end to the pins, and at their opposite ends to cross bars or cranks 64 on a transverse rotatable shaft 65. The shaft 65 is formed at its ends with angular handle portions 66 which preferably lie in recesses on the edges of the panel.

This construction is adapted to compensate for variations in the width of a car and for corresponding variations in the space between the tracks. The pins normally project far enough beyond the ends of the panel to engage tracks spaced the maximum distance apart and can be retracted by turning one of the handles 66 so that the panel can be inserted into the car. Once in the car the handle may be released so that the pins will be pressed outwardly into engagement with the car side walls and will be in a position to engage the tracks when the panel is lowered on to the tracks.

While several embodiments of the invention have been shown and described in detail, it will be understood that these are illustrative only and are not to be taken as a definition of the scope of the invention, reference being had for this purpose to the appended claims.

What is claimed is:

1. In a bulkhead for a freight carrier, where the freight carrier is equipped with vertically-spaced, horizontally-extending apertured track means extending along but spaced inwardly of opposed sidewalls and adapted for aperture-receiving cooperation with elements on the bulkhead for retaining the bulkhead in selected positions in the carrier, the improved bulkhead comprising, in combination: an elongated rectangular planar panel of a length substantially to span the interior of a freight carrier between the track means on the sidewalls thereof and provided with faces which adapt the panel to serve selectively as a pallet for carrying goods or as a load-dividing bulkhead, two aperture means on the panel adapted to receive therein tines of a forklift truck and positioned and arranged on the panel to open in directions transverse to the longitudinal edges of the panel and to the faces of the panel, so that the panel may be lifted by a forklift truck selectively in a substantially horizontal attitude and in a substantially vertical attitude, and a pair of support members at both ends of the panel spaced from each other and extending a fixed distance outwardly of the ends of the panel, each support member having thereon an aperture-entering and track-engaging portion and a restraining portion, the aperture-entering and track-engaging portion being shaped and arranged to be selectively entered and withdrawn from an aperture of said apertured track means regardless of whether the panel is at a horizontal or vertical attitude and adapted to engage and cooperate with said track means on the walls of the freight carrier to support the panel on the track means and prevent longitudinal movement of the panel along the track means regardless of whether the panel is disposed horizontally or vertically, and the restraining portions of the support members at opposite ends of the panel providing spaced abutment surfaces spaced apart a distance greater than the length of the panel and greater than the minimum spacing between portions of track means on opposed walls, so that the restraining portions of the support members are adapted to cooperate with the track means to prevent dislocation of the panel relative to the track means in directions longitudinally of the panel, and each said support member constituting an elongated cylindrical pin member permanently secured to and projecting outwardly from the ends of the panel, the pin member providing an elongated cylindrical shank portion adapted for entry at any attitude of the panel into upwardly-opening slots in the track means, and the distal end of the pin member having an enlarged head thereon to provide said restraining portion.

2. A lading separating means as in claim 1 including a lock member carried by the freight carrier adjacent the apertured track means and arranged to cooperate with portions of the support members on the panel when the panel is in an operative position supported on the track means in the freight carrier.

3. A lading separating means as in claim 2 wherein the lock member is spaced above the track means on the wall of the carrier and is arranged to move outwardly of the wall of the carrier to overlie portions of the support member and be positioned to engage said support members upon upward movement of the support members relative to the track means.

4. A lading separating means as in claim 2 wherein the aperture-entering portions of the support members have a lock surface defined thereon, and the lock member is movable between alternate positions of engagement and disengagement with the lock surface.

5. A bulkhead-pallet as in claim 1 wherein the faces of the panel are spaced apart, there being tine-receiving apertures in both said panel faces, safety means for preventing accidental displacement of the panel from the track means including members carried by the panel between the spaced faces and adjacent tine-receiving apertures and having portions thereof extending across the tine-receiving apertures to be normally positioned for engagement with and movement by the tines as relative vertical movement takes place between the panel and the tines during lifting movement of the panel in the vertical attitude, and biasing means tending to restore said members toward their normal position when the tines are withdrawn from said face-apertures.

6. A bulkhead-pallet as in claim 5 wherein the members are mounted to pivot about axes that are offset from the tine-receiving apertures outwardly toward the ends of the panel.

7. A bulkhead-pallet as in claim 1 wherein the panel carries movable safety elements located at both ends of the panel arranged to cooperate with the track means on the walls of a freight car when in one position to prevent accidental displacement of the panel from the track means, and means on the panel for actuating the safety elements away from said one position when the tines of a forklift truck are entered into the aperture means of the panel and are operating to lift the panel at either a horizontal or vertical attitude.

8. A lading separating means for a freight carrier having spaced elongated sidewalls, comprising, in combination: vertically-spaced, horizontally-extending, apertured track means extending along but spaced inwardly of opposed sidewalls and adapted for aperture-receiving cooperation with elements on the bulkhead for retaining the bulkhead in selected positions in the car; an elongated, rectangular planar panel of a length substantially to span the freight carrier between the sidewalls thereof and provided with faces which adapt the panel to serve selectively as a pallet for carrying goods or as a load-dividing bulkhead, two aperture means on the panel adapted to receive therein tines of a forklift truck and positioned and arranged on the panel to open in directions transverse to the longitudinal edges of the panel and to the faces of the panel, so that the panel may be lifted by a forklift truck selectively in a substantially horizontal attitude and in a substantially vertical attitude, a pair of support members at both ends of the panel spaced from each other and extending outwardly of the ends of the panel, each support member having thereon an aperture-entering and track-engaging portion and a restraining portion, the aperture-entering and track-engaging portion being shaped and arranged to be selectively entered and withdrawn from an aperture of said apertured track means and adapted to engage and cooperate with said track means on the walls of the freight car to support the panel on the track means and to prevent longitudinal movement of the panel along the track means regardless of whether the panel is disposed horizontally or vertically, and the restraining portions of the support members at opposite ends of the panel providing spaced abutment surfaces spaced apart a distance greater than the length of the panel and greater than the minimum spacing between portions of track means on opposed walls, so that the restraining portions of the support members are adapted to cooperate with the track means to prevent dislocation of the panel relative to the track means in directions transverse to the track means; and lock means operatively associated with one of the track means and panel for preventing accidental displacement of the panel and its support members from the track means, said lock means being normally biased to a locking position, and actuator means for withdrawing the lock means to a non-locking position including elements positioned adjacent said aperture means in the panel and adapted to be engaged by tines of a forklift truck when entered into said aperture means.

9. A lading separating means as in claim 8 wherein the lock means includes movable lock elements carried by the panel and movable to a position outwardly of the panel and in vertical register with a portion of the track means, so as to engage the track means in the event of tendency of the panel and support members to move vertically relative to the track means.

10. A lading separating means as in claim 8 including substantially smooth, horizontal guide surfaces provided above certain of the track means and positioned to be engaged by portions of said support members on a panel to guide movement of the panel in the freight carrier.

11. A lading separating means for a freight carrier having spaced elongated side walls, comprising, in combination: vertically-spaced, horizontally-extending, apertured track means extending along but spaced inwardly of opposed sidewalls and adapted for aperture-receiving cooperation with elements on the bulkhead for supporting and retaining the bulkhead in selected positions in the car; an elongated, rectangular planar panel of a length substantially to span the freight carrier between the sidewalls thereof and provided with faces which adapt the panel to serve selectively as a pallet for carrying goods or as a load-dividing bulkhead, two aperture means on the panel adapted to receive therein tines of a forklift truck and positioned and arranged on the panel to open in directions transverse to the longitudinal edges of the panel and to the faces of the panel, so that the panel may be lifted by a forklift truck selectively in a substantially horizontal attitude and in a substantially vertical attitude, a pair of support members at both ends of the panel spaced from each other and extending at a fixed distance and attitude outwardly of the ends of the panel, each support member having thereon an aperture-entering and track-engaging portion and a restraining portion, the aperture-entering and track-engaging portion being shaped and arranged to be selectively entered and withdrawn from an aperture of said apertured track means and adapted to engage and cooperate with said track means on the walls of the freight car to support the panel on the track means and prevent longitudinal movement of the panel along the track means regardless of whether the panel is disposed horizontally or vertically, and the restraining portions of the support members at opposite ends of the panel providing spaced abutment surfaces spaced apart a distance greater than the length of the panel and greater than the minimum spacing between portions of track means on opposed walls, so that the restraining portions of the support members are adapted to cooperate with the track means to prevent dislocation of the panel relative to the track means in directions transverse to the track means.

12. A lading separating means as in claim 11 wherein each apertured track means includes an elongated upright member secured to and spaced inwardly of a wall of the freight carrier and formed with a series of upwardly opening notches therein, and each support member being a pin having an elongated cylindrical shank of a dimension to freely enter each notch of the series of notches in said upright member and having an enlarged head at the distal end thereof adapted to freely enter the space between said upright member and the adjacent carrier wall but being of greater transverse width than the width of a notch in said upright member.

References Cited

UNITED STATES PATENTS

| | | |
|---|---|---|
| 2,988,017 | 6/1961 | Stough. |
| 3,114,338 | 12/1963 | Schroeder et al. |
| 3,352,595 | 11/1967 | Bezlaj et al. |
| 2,160,870 | 6/1939 | Jones _____ 105—376 |
| 2,812,974 | 11/1957 | McHugh _____ 105—366 X |
| 2,898,872 | 8/1959 | Hastings _____ 105—366 |
| 3,070,044 | 12/1962 | Tobin _____ 105—376 |

DRAYTON E. HOFFMAN, Primary Examiner

U.S. Cl. X.R.

105—369